US012799404B2

(12) United States Patent
Kou et al.

(10) Patent No.: US 12,799,404 B2
(45) Date of Patent: *Nov. 17, 2026

(54) SLURRY REACTOR SYSTEM FOR UPGRADING FEEDSTOCK

(71) Applicant: Chevron U.S.A. Inc., San Ramon, CA (US)

(72) Inventors: Bo Kou, Albany, CA (US); Shuwu Yang, Richmond, CA (US); Ramin Abhari, Bixby, OK (US); Theodorus Ludovicus Michael Maesen, Spring, TX (US); Michelle K. Young, Manvel, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 253 days.

This patent is subject to a terminal disclaimer.

(21) Appl. No.: 18/667,040

(22) Filed: May 17, 2024

(65) Prior Publication Data

US 2025/0354067 A1 Nov. 20, 2025

(51) Int. Cl.
*C10G 3/00* (2006.01)
*B01J 8/00* (2006.01)
(Continued)

(52) U.S. Cl.
CPC ................ *C10G 3/56* (2013.01); *B01J 8/005* (2013.01); *B01J 8/0085* (2013.01); *B01J 8/1818* (2013.01);
(Continued)

(58) Field of Classification Search
CPC .. C10G 3/56; C10G 49/12; C10G 2300/1014; C10G 2300/1018; C10G 2300/4006; C10G 2300/4081
See application file for complete search history.

(56) References Cited

U.S. PATENT DOCUMENTS

2011/0167713 A1 7/2011 Quignard et al.
2012/0238791 A1 9/2012 Abhari et al.
(Continued)

FOREIGN PATENT DOCUMENTS

WO 20230187732 A1 10/2023

OTHER PUBLICATIONS

PCT/US2025/013331, International Search Report, Apr. 29, 2025, 15 pages.

*Primary Examiner* — Vishal V Vasisth

(74) *Attorney, Agent, or Firm* — Michael E. Carmen; Terrence M. Flaherty

(57) ABSTRACT

A slurry reactor system including a slurry reactor configured to convert, under slurry hydroconversion conditions, a slurry reactor content flowing upwards and containing a feedstock including one or more of fats, oils and greases, a slurry hydroconversion catalyst and a hydrogen stream to a slurry hydroconversion effluent containing a slurry phase effluent including catalyst particles and a liquid product and a vapor phase effluent including a hydroconversion product, and a separation unit external to the slurry reactor to separate the slurry phase effluent from the vapor phase effluent to produce a recycled slurry stream. An inlet of the separation unit is in fluid communication with an outlet of the slurry reactor to receive the slurry hydroconversion effluent from the slurry reactor and an outlet of the separation unit is in fluid communication with an inlet of the slurry reactor to receive the recycled slurry stream from the separation unit.

20 Claims, 6 Drawing Sheets

(51) Int. Cl.
*B01J 8/18* (2006.01)
*B01J 8/22* (2006.01)

(52) U.S. Cl.
CPC ........... *B01J 8/1854* (2013.01); *B01J 8/1872* (2013.01); *B01J 8/226* (2013.01); *C10G 2300/1014* (2013.01); *C10G 2300/1018* (2013.01); *C10G 2300/4006* (2013.01); *C10G 2300/4081* (2013.01)

(56) References Cited

U.S. PATENT DOCUMENTS

2013/0146508 A1 6/2013 Quignard et al.
2023/0272293 A1 8/2023 Weiss et al.

SLURRY REACTOR SYSTEM FOR UPGRADING FEEDSTOCK

BACKGROUND

There is an increasing interest in alternative feedstocks for replacing at least partly crude oil, in the production of hydrocarbons, suitable as fuels or fuel components such as, for example, transportation fuels, or compatible with fuels. Biofuels are typically manufactured from feedstocks originating from renewable sources including oils and fats obtained from plants, animals, algal materials, fish, and various waste streams, side streams and sewage sludge. For example, Fats, Oils, and Grease (FOGs) have been a burden to society by causing pipeline blockage, sewer overflow, property damage, and taking up space in landfills. A large part of FOGs is processed at FOG generators such as food processors, food producers, Wastewater Treatment Plants, grease haulers, oil handlers, and the like, before being sent to landfills as waste grease.

SUMMARY

In accordance with an illustrative embodiment, a slurry reactor system comprises:

a slurry reactor configured to convert, under slurry hydroconversion conditions, a slurry reactor content flowing upwards and comprising a feedstock comprising one or more of fats, oils and greases, a slurry hydroconversion catalyst and a hydrogen stream to a slurry hydroconversion effluent comprising a slurry phase effluent comprising catalyst particles and a liquid product and a vapor phase effluent comprising a hydroconversion product, and a separation unit external to the slurry reactor, the separation unit being configured to separate the slurry phase effluent from the vapor phase effluent to produce a slurry recycle stream, wherein an inlet of the separation unit is in fluid communication with an outlet of the slurry reactor to receive the slurry hydroconversion effluent from the slurry reactor and an outlet of the separation unit is in fluid communication with an inlet of the slurry reactor to receive the slurry recycle stream from the separation unit, wherein the slurry reactor is further configured to provide backmixing to fluidize the slurry hydroconversion catalyst to maintain a substantially homogeneous slurry reactor content, and a substantially isothermal temperature profile in the slurry reactor, and wherein at least about 60% of the feedstock is converted into the vapor phase effluent.

In accordance with another illustrative embodiment, a continuous process comprises:

converting, under slurry hydroconversion conditions, a slurry reactor content flowing upwards in a slurry reactor and comprising a feedstock comprising one or more of fats, oils and greases, a slurry hydroconversion catalyst and a hydrogen stream to a slurry hydroconversion effluent comprising a slurry phase effluent comprising catalyst particles and a liquid product and a vapor phase effluent comprising a hydroconversion product, separating, in a separation unit external to the slurry reactor, the slurry phase effluent comprising catalyst particles and liquid product from the vapor phase effluent comprising a hydroconversion product to produce a slurry recycle stream, and flowing the slurry recycle stream to the slurry reactor, wherein the slurry reactor is configured to provide backmixing to fluidize the slurry hydroconversion catalyst to maintain a substantially homogeneous slurry reactor content, and a substantially isothermal temperature profile in the slurry reactor, and wherein at least about 60% of the feedstock is converted into the vapor phase effluent.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated herein by way of example but not limitation. The principles illustrated in the example embodiments of the drawings can be applied to alternate processes and apparatus. Additionally, the elements and features shown in the drawings are not necessarily to scale, emphasis instead being placed upon clearly illustrating the principles of the example embodiments. Certain dimensions or positions may be exaggerated to help visually convey such principles. In the drawings, the same reference numerals used in different embodiments designate like or corresponding, but not necessarily identical, elements. In the accompanying drawings.

DETAILED DESCRIPTION

Figure 1A:
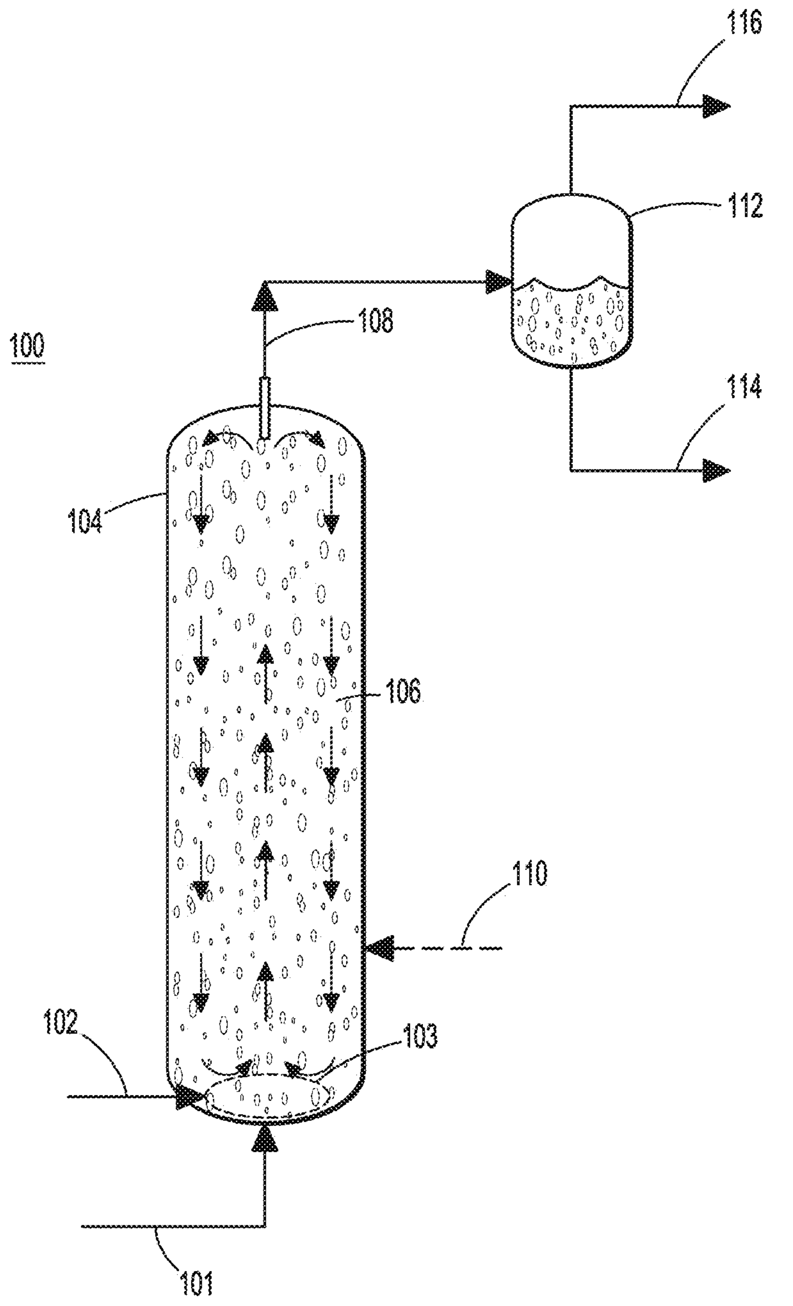
FIG. 1A illustrates a schematic diagram of a slurry reactor system and process for upgrading a feedstock comprising one or more of fats, oils and greases, according to an illustrative embodiment.

Various illustrative embodiments described herein are directed to slurry reactor systems and processes for the hydroconversion of a feedstock comprising one or more of fats, oils and greases to, for example, a renewable fuel such as diesel fuel, jet fuel, and gasoline. The hydroconversion of a feedstock comprising one or more of fats, oils and greases into, for example, added value fuels, also offers one alternative to crude.

Substitution of fossil fuels with biofuels reduces greenhouse gas emissions, which depends on the feedstock used for production of the biofuel. Low-value and waste fats, oils, and greases ("FOG"), unlike most vegetable oils, are inedible byproducts and waste streams from food processing industries and water treatment plants. For example, in production of renewable diesel, the lipid feed with varying free fatty acid content is converted to isoparaffinic hydrocarbons in hydroprocessing reactors. The hydroprocessing reactors are typically high-pressure vessels packed with extrudate catalysts that are impregnated with hydrogenation metals (e.g., Ni, Mo, Co, W, Pd, and Pt).

Fixed bed reactors have been widely used to upgrade feedstocks comprising one or more of fats, oils and greases into renewable diesel fuel and sustainable aviation fuels (SAF). However, there are several challenges related to this operation. For example, the highly exothermic reaction requires a large recycle stream to compensate for the temperature rise along the reactor. In addition, the cycle time is not as good as a fossil feed due to faster catalyst deactivation. In view of these challenges, there is a need for solutions to upgrading FOG feedstocks to produce value-added fuels.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology can be applied, as long as that definition does not conflict with any other disclosure or definition applied herein or render indefinite or non-enabled any claim to which that definition is applied. To the extent that any definition or usage provided by any document incorporated herein by reference conflicts with the definition or usage provided herein, the definition or usage provided herein controls.

While systems and processes are described in terms of "comprising" various components or steps, the systems and processes can also "consist essentially of" or "consist of" the various components or steps, unless stated otherwise.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, ±3% of the stated value, or ±1% of the stated value.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any members of a claimed group.

The term "hydroconverting" or "hydroconversion", as used herein refers to any process in which hydrocarbons are processed or treated in the presence of a hydrogen stream and a catalyst. Representative examples of hydroconverting include hydrocracking, hydrotreating, hydrogenation, deoxygenation, desulfurization, denitrogenation, demetallization, dechlorination, decarboxylation, decarbonylation, dearomatization or a combination thereof.

The term "hydrocracking", as used herein, refers to a process in which hydrocarbons crack in the presence of a hydrogen stream to lower molecular weight hydrocarbons. Hydrocracking also includes slurry hydrocracking in which feed is mixed with catalyst and hydrogen to make a slurry and cracked to lower boiling products.

The term "hydrotreating" refers to processes wherein a hydrogen-containing treat gas is used in the presence of suitable catalysts which are primarily active for the removal of heteroatoms, such as sulfur, nitrogen, oxygen and metals from the hydrocarbon feedstock. In hydrotreating, hydrocarbons with double and triple bonds such as olefins may be saturated. Aromatics may also be saturated. Some hydrotreating processes are specifically designed to saturate aromatics. In hydrotreating, a feed derived from a biological source is subjected to hydrodeoxygenation, decarboxylation and/or decarbonylation.

The term "continuous" as used herein shall be understood to mean a system that operates without interruption or cessation for a period of time, such as where reactant(s) and catalyst(s) are continually fed into a reaction zone and products are continually or regularly withdrawn without stopping the reaction in the reaction zone.

A "fresh catalyst" as used herein denotes a catalyst which has not previously been used in a catalytic process.

A "spent catalyst" as used herein denotes a catalyst that has less activity at the same reaction conditions (e.g., temperature, pressure, inlet flows) than the catalyst had when it was originally exposed to the process. This can be due to a number of reasons, several non-limiting examples of causes of catalyst deactivation are coking or carbonaceous material sorption or accumulation, steam or hydrothermal deactivation, metals (and ash) sorption or accumulation, attrition, morphological changes including changes in pore sizes, cation or anion substitution, and/or chemical or compositional changes.

The term "renewable" refers to a material that is produced from a renewable resource, which is a resource produced via a natural process at a rate comparable to its rate of consumption (e.g., within a 100-year time frame). The renewable resource can be replenished naturally or via agricultural techniques. Non-limiting examples of renewable resources include plants, animals, fish, bacteria, fungi, and forestry products. These resources can be naturally occurring, hybrids, or genetically engineered organisms. Natural resources such as crude oil (petroleum), natural gas, coal, peat, etc. take longer than 100 years to form and thus they are not considered renewable resources.

The term "biocrude" refers to oils produced from biomass by employing any liquefaction process such as a hydrothermal liquefaction, pyrolysis and hydropyrolysis, or processed oils which contain 20% or more of water.

The terms "upgrade", "upgrading" and "upgraded", when used to describe a feedstock that is being or has been subjected to hydroprocessing, or a resulting material or product, refer to one or more of a reduction in molecular weight of the feedstock, a reduction in boiling point range of the feedstock, a reduction in concentration of hydrocarbon free radicals, and/or a reduction in quantity of impurities, such as sulfur, nitrogen, oxygen, halides, and metals.

The term "zone" can refer to an area including one or more equipment items and/or one or more sub-zones. Equipment items can include one or more reactors or reactor vessels, separation vessels, distillation towers, heaters, exchangers, pipes, pumps, compressors, and controllers. Additionally, an equipment item, such as a reactor, dryer, or vessel, can further include one or more zones or sub-zones.

The term "effluent" refers to a stream that is passed out of a reactor, a reaction zone, or a separator following a particular reaction or separation. Generally, an effluent has a different composition than the stream that entered the reactor, reaction zone, or separator. It should be understood that when an effluent is passed to another component or system, only a portion of that effluent may be passed. For example, a slipstream may carry some of the effluent away, meaning that only a portion of the effluent may enter the downstream component or system.

The non-limiting illustrative embodiments described herein overcome the drawbacks discussed above by providing slurry reactor systems and processes for continuously upgrading a feedstock comprising one or more of fats, oils and greases to, for example, renewable fuels such as diesel fuel, gasoline and sustainable aviation fuels. Slurry reactors have some distinctive features and benefits. They consist of a solid catalyst suspended in a liquid, through which a gas is bubbled. One of the advantages of slurry reactors is that they can achieve a uniform temperature profile even for highly exothermic reactions, based in part on the backmixing of the liquid phase, i.e., the slurry reactor content. Backmixing is the process of mixing the liquid and the catalyst particles in the reactor, which ensures a homogeneous distribution of temperature, concentration, and catalyst activity.

Another advantage of slurry reactors is that they allow for online catalyst replacement, such that the slurry reactor does not have to be shut down in order to replace catalyst as in fixed-bed reactors. Fixed-bed reactors are reactors where the catalyst is packed in a fixed structure, such as a tube or a column. In slurry reactors, the catalyst can be easily added or withdrawn from the reactor by controlling the flow rate of the liquid. This way, the overall catalytic activity can be maintained at a constant level by compensating for catalyst deactivation or poisoning. Furthermore, slurry reactors avoid the problems of fouling and plugging that may occur in fixed-bed reactors, since the catalyst is in powder form and the liquid is the continuous phase. Fouling is the accumulation of unwanted substances on the catalyst surface and interstitial space, which reduces its effectiveness and increases the pressure drop in the reactor. Plugging is the blockage of the reactor channels by solid deposits or agglomerates, which impedes the flow of the reactants and products.

The non-limiting illustrative embodiments of the present disclosure will be specifically described below with reference to the accompanying drawings. For the purpose of clarity, some steps leading up to the production of a renewable fuel as illustrated in FIGS. 1A-2B may be omitted. In other words, one or more well-known processing steps which are not illustrated but are well-known to those of ordinary skill in the art have not been included in the figures. This is not intended to be interpreted as a limitation of any particular embodiment, or illustration, or scope of the claims.

General Process

The non-limiting illustrative embodiments described herein are directed to a continuous process for upgrading a feedstock comprising one or more of fats, oils and greases to produce a renewable fuel utilizing a slurry reactor system. In non-limiting illustrative embodiments, the process involves converting, under slurry hydroconversion conditions, a slurry reactor content flowing upwards in a slurry reactor and comprising a feedstock comprising one or more of fats, oils and greases, a slurry hydroconversion catalyst and a hydrogen stream to a slurry hydroconversion effluent comprising a slurry phase effluent comprising catalyst particles and a liquid product and a vapor phase effluent comprising a hydroconversion product.

In non-limiting illustrative embodiments, the process can involve removing the slurry hydroconversion effluent comprising the slurry phase effluent comprising catalyst particles and the liquid product and the vapor phase effluent comprising the hydroconversion product from the slurry reactor system.

In non-limiting illustrative embodiments, the process can involve flowing the slurry hydroconversion effluent comprising the slurry phase effluent comprising catalyst particles and a liquid product and the vapor phase effluent comprising the hydroconversion product from the slurry reactor to a given separation unit of one or more separation units, and separating the slurry phase effluent from the vapor phase effluent to provide a slurry recycle stream. In some embodiments, the process can further involve flowing the slurry recycle stream to the slurry reactor based in part on a density difference between the slurry recycle stream and the slurry reactor content. In some embodiments, the process can further involve flowing the slurry recycle stream to a recirculation pump and recirculating the slurry recycle stream to the slurry reactor.

In non-limiting illustrative embodiments, the process can involve separating, in a separation unit internal to the slurry reactor, at least a portion of the vapor phase effluent from the slurry hydroconversion effluent to produce a mixture of vapor and the slurry hydroconversion effluent having a reduced vapor phase content. In some embodiments, the process can involve recirculating the mixture of vapor and the slurry hydroconversion effluent having a reduced vapor phase content flowing downwards in the slurry reactor to be combined with the slurry reactor content.

In non-limiting illustrative embodiments, the process involves at least about 60% of the total amount of feedstock in the slurry reactor content being converted into the vapor phase effluent. In some embodiments, the slurry phase effluent includes the catalyst particles and no more than about 40% of the feedstock. This, in turn, allows for a catalyst concentration in the slurry reactor to be at least 250% of the catalyst concentration in the slurry reactor content. In some embodiments, the slurry phase effluent includes the catalyst particles and no more than about 40% of the feedstock and the hydroconversion product in liquid form. As one skilled in the art will appreciate, vaporization of the hydrocarbon product will necessarily promote backmixing in the slurry reactor. For example, when the slurry reactor content is flowing upwards in the slurry reactor and vaporization is occurring, the concentration of the slurry catalyst in the slurry reactor content increases, thereby resulting in a slurry reactor content having a higher density. Thus, by gravity, the slurry reactor content following vaporization will then flow downwards resulting in backmixing into the incoming slurry reactor content. In some embodiments, the slurry reactor content following vaporization will flow downward in proximity to walls of the slurry reactor based in part on gravity.

In non-limiting illustrative embodiments, the process involves at least about 80% of the total amount of feedstock in the slurry reactor content being converted into the vapor phase effluent. In some embodiments, the slurry phase effluent includes the catalyst particles and no more than about 20% of the feedstock. This, in turn, allows for a catalyst concentration in the slurry reactor to be at least 400% of the catalyst concentration in the slurry reactor content. In some embodiments, the slurry phase effluent includes the catalyst particles and no more than about 20% of the feedstock and the hydroconversion product in liquid form.

In non-limiting illustrative embodiments, the process involves at least about 90% of the total amount of feedstock in the slurry reactor content being converted into the vapor phase effluent. In some embodiments, the slurry phase effluent includes the catalyst particles and no more than about 10% of the feedstock. This, in turn, allows for a catalyst concentration in the slurry reactor to be at least 500% of the catalyst concentration in the slurry reactor content. In some embodiments, the slurry phase effluent includes the catalyst particles and no more than about 10% of the feedstock and the hydroconversion product in liquid form.

Feedstock

The feedstock to be employed is not particularly limited and may include, for example, one or more of fats, oils and greases. In some embodiments, the feedstock includes, for example, one or more of animal fats, animal oils, plant fats, plant oils, vegetable fats, vegetable oils, greases, and used cooking oil. In some embodiments, suitable animal fats and/or animal oils may include, for example, inedible tallow, edible tallow, technical tallow, floatation tallow, lard, poultry fat (e.g., chicken fat), poultry oils, fish fat, fish oils, and mixtures thereof. In some embodiments, suitable plant and/or vegetable oils may include, for example, babassu oil, *carinata* oil, soybean oil, inedible corn oil, canola oil, coconut oil, rapeseed oil, tall oil, tall oil fatty acid, palm oil, palm oil fatty acid distillate, palm sludge oil, jatropha oil, palm kernel oil, sunflower oil, castor oil, camelina oil, archacal oil, and mixtures of any two or more thereof. These may be classified as crude, degummed, and RBD (refined, bleached, and deodorized) grade, depending on level of pretreatment and residual phosphorus and metals content. However, any of these grades may be used in the present disclosure. In some embodiments, suitable greases may include, for example, yellow grease, brown grease, used cooking oil, waste vegetable oils, restaurant greases, trap grease from municipalities such as water treatment facilities, and spent oils from industrial packaged food operations and mixtures of any two or more thereof. For example, in any embodiment herein, the composition may include yellow grease, brown grease, floatation grease, poultry fat, inedible corn oil, used cooking oil, inedible tallow, floatation tallow, palm sludge oil, or a mixture of any two or more thereof. In some embodiments, the feedstock disclosed herein can be a mixture of two or more of any of the foregoing animal fats, animal oils, plant fats, plant oils, vegetable fats, vegetable oils, greases, and used cooking oil.

In some embodiments, the feedstock can further include one or more biocrudes such as, for example, tall oil products, renewable liquid products from other liquefaction processes such as pyrolysis oil from biomass, hydrothermal liquefaction product from biomass, distiller corn oil and the like. Suitable tall oil products include, for example, crude tall oil, tall oil fatty acid, distilled tall oil, rosin acid and top oil pitch.

The term "tall oil pitch (TOP)" refers to residual bottom residual bottom fraction from tall oil distillation processes. In some embodiments, tall oil pitch comprises from about 34 to about 51 wt. % free acids, from about 23 to about 37 wt. % esterified acids, and from about 25 to about 34 wt. % unsaponifiable neutral compounds of the total weight of the tall oil pitch. The free acids include, for example, dehydroabietic acid, abietic and other resin acids. The esterified acids include, for example, oleic and linoleic acids. The unsaponifiable neutral compounds include, for example, diterpene sterols, fatty alcohols, sterols, and dehydrated sterols.

The term "crude fatty acid (CFA)" refers to fatty acid-containing materials obtainable by purification (e.g., distillation under reduced pressure, extraction, and/or crystallization) of crude tall oil (CTO).

The term "tall oil fatty acid (TOFA)" refers to fatty acid rich fraction of crude tall oil (CTO) distillation processes. TOFA comprises mainly fatty acids, such as at least about 80 wt. % of the total weight of the TOFA. In some embodiments, TOFA comprises less than about 10 wt. % rosin acids.

The term "distilled tall oil (DTO)" refers to resin acid rich fraction of crude tall oil (CTO) distillation processes. DTO comprises mainly fatty acids, such as from about 55 to about 90 wt. %, and resin acids, such as from about 10 to about 40 wt. % resin acids, of the total weight of the DTO. In some embodiments, DTO comprises less than about 10 wt. % unsaponifiable neutral compounds of the total weight of the distilled tall oil.

The term "microbial oils" refers to triglycerides (lipids) produced by microbes. The term "algal oils" refers to oils derived directly from algae. The term "animal fats and oils" refers to lipid materials derived from animals.

In some embodiments, the feedstock can contain relatively high amounts of contaminants such as phosphorus, silicon, and chlorine compounds, as well as various solubilized metals and polymers (e.g. polyethylene). For example, in some embodiments, the feedstock can have a phosphorus and metals content greater than about 10 weights parts per million (wppm). In some embodiments, the feedstock can have a phosphorus and metals content greater than about 100 wppm. In some embodiments, the feedstock can have a phosphorus and metals content of no more than about 1000 ppm. In some embodiments, the feedstock can have a phosphorus and metals content of no more than about 1500 ppm. In some embodiments, the feedstock can be a non-pretreated feedstock.

Slurry Hydroconversion Catalyst

The slurry hydroconversion process uses a dispersed catalyst which can be continuously doped into the feed. In some embodiments, the catalyst can correspond to one or more catalytically active metals in particulate form and/or supported on particles. In some embodiments, the slurry hydroconversion catalyst may be a precursor thereof.

In some embodiments, the slurry hydroconversion catalyst is generally provided in the form of fine particulates dispersed within the reactor liquid reaction medium and may be a supported catalyst, an unsupported catalyst, or a combination thereof. In some embodiments, the slurry hydroconversion catalyst comprises a metal selected from Group VIB, Group VIII of the Periodic Table, or a combination thereof. The slurry hydroconversion catalyst may be unsulfided or pre-sulfided before being added to the reactor. The slurry hydroconversion catalyst can comprise one or more different slurry hydroconversion catalysts as a single combined feed stream or as separate feeds to the reactor. In some embodiments, the slurry hydroconversion catalyst may have an average particle size of at least about 0.1 micron to about 200 microns. In some embodiments, the slurry hydroconversion catalyst may have an average particle size of at least about 0.1 micron to about 100 microns, e.g., from about 1 to about 10 microns. In some embodiments, the slurry hydroconversion catalyst comprises a metal sulfide comprising one or more metals selected from the group consisting of molybdenum, nickel, cobalt and tungsten, and the slurry hydroconversion catalyst comprises particles having an average particle size of about 0.1 micron to about 200 microns.

Slurry Hydroconversion Process

In an illustrative embodiment, as may be combined with one or more of the preceding paragraphs, slurry hydroconversion processes for preparing one or more upgraded products generally involve passing the feedstock and slurry hydroconversion catalyst, as described above, through a slurry hydroconversion reaction zone in a slurry reactor in the presence of a hydrogen stream under slurry hydroconversion conditions to provide a slurry hydroconversion effluent comprising a slurry phase effluent comprising catalyst particles and a liquid product and a vapor phase effluent comprising a hydroconversion product. In some embodiments, the liquid product can be composed of, for example, unconverted feedstock, partially converted feedstock, unvaporized hydroconversion product, etc.

The slurry hydroconversion process can be operated under slurry hydroconversion conditions including, for example, a pressure, in a range of from about 300 psig to about 2500 psig. The reactor temperature can be operated in a range from about 260° C. to about 426° C. (about 500° F. to about 800° F.), or from about 287° C. to about 399° C. (from about 550° F. to about 750° F.). The liquid hourly space velocity (LHSV) by reactor volume can range below about 6.0 $h^{-1}$ on a fresh feed basis, such as a range of from about 0.2 h 1 to about 2 h 1. The average residence time can range from about 10 minutes to about 5 hours. The amount of the hydrogen stream fed to the reactor for slurry hydroconverting can be up to about 3000 scf/B, or up to about 15000 scf/B fresh feed or from about 4,000 SCF/bbl to about 10,000 SCF/bbl fresh feed.

The feedstock fed to the slurry reactor may undergo various hydroconversion reactions, including, for example, hydrocracking, hydrogenation, hydrodeoxygenation, hydrodesulfurization, hydrodenitrogenation, hydrodemetallization, hydrodechlorination, hydrodecarboxylation, hydrodecarbonylation, hydrodearomatization or a combination thereof.

The feedstock and slurry hydroconversion catalyst can be combined in any order in the slurry reactor in the slurry hydroconversion reaction zone to form a combined feed stream. In some embodiments, the feedstock and slurry hydroconversion catalyst are co-fed to the slurry reactor. In some embodiments, the feedstock and slurry hydroconversion catalyst are separately fed to the slurry reactor. In some embodiments, the feedstock and slurry hydroconversion catalyst are pre-mixed prior to being fed to the slurry reactor. In some embodiments, hydrogen can be fed to the slurry reactor and may be combined with any of the feeds or separately fed to the reactor. In some embodiments, two or more of the feedstock, slurry hydroconversion catalyst and hydrogen may be pre-mixed in any combination or amount before being fed to the slurry reactor.

Reactor Systems

Figure 1B:
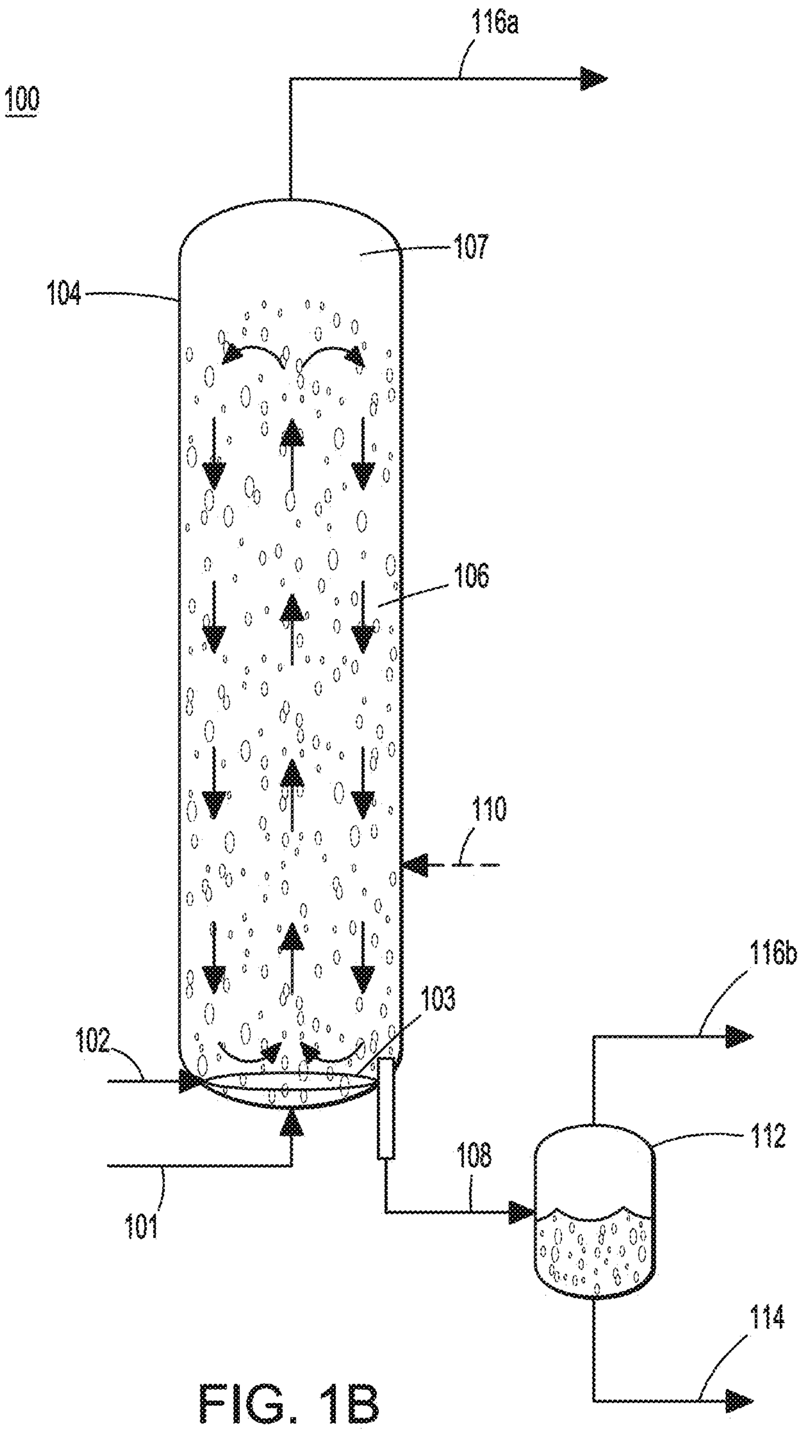
FIG. 1B illustrates a schematic diagram of a slurry reactor system and process for upgrading a feedstock comprising one or more of fats, oils and greases, according to an illustrative embodiment.

Referring now to the drawings in more detail, FIGS. 1A-ID illustrate a slurry reactor system 100 according to illustrative embodiments of the invention. Referring to FIGS. 1A and 1B, slurry reactor system 100 including at least a slurry reactor 104 and a separation unit 112. It is to be understood that slurry reactor system 100 including at least slurry reactor 104 and separation unit 112 is not limited to the configuration of the embodiments shown in FIGS. 1A-1D, and other configurations are contemplated herein.

In some embodiments, suitable slurry reactors for slurry reactor 104 of slurry reactor system 100 include continuous stirred tank reactors, fluidized bed reactors, spouted bed reactors, spray reactors, bubble column reactors, liquid recirculation reactors, slurry recirculation reactors, and combinations thereof. In some embodiments, slurry reactor 104 of slurry reactor system 100 is an upright cylindrical separative reactor. In another embodiment, slurry reactor 104 is a bubble column reactor. One or more slurry reactors may be utilized in parallel or in series.

In some embodiments, slurry reactor 104 is a bubble column reactor. A bubble column reactor is an upflow reactor in which a feedstock and a slurry hydroconversion catalyst (also referred to as feed stream) are introduced into slurry reactor 104 via line 101 and the hydrogen stream is introduced into slurry reactor 104 via line 102 at or near the bottom of slurry reactor 104. Although it is shown that the feedstock and slurry hydroconversion catalyst are co-fed into slurry reactor 104 via line 101, it is contemplated that any arrangement for introducing the feedstock and slurry hydroconversion catalyst into slurry reactor 104 can be utilized in the present disclosure.

In some embodiments, slurry reactor 104 of slurry reactor system 100 further includes a gas sparger 103 (also referred to as a flow distributor) for receiving the hydrogen stream via line 102. In some embodiments, gas sparger 103 may be of various configurations such as, for example, a ring-type sparger with multiple orifices, a sintered metal plate or sintered metal distributing pipe(s). The function of gas sparger 103 is to uniformly distribute the hydrogen stream as tiny bubbles in slurry reactor 104.

In some embodiments, gas sparger 103 in slurry reactor 104 can provide sufficient backmixing to fluidize the slurry hydroconversion catalyst to maintain a homogeneous or substantially homogeneous slurry reactor content, and an isothermal or substantially isothermal temperature profile in slurry reactor 104. An advantage of maintaining an isothermal or substantially isothermal temperature profile may be increased catalyst efficiency and improved product yield. As used herein, the term "isothermal or substantially isothermal temperature profile" means that the temperature at each point between the reactor inlet at a bottom portion of slurry reactor 104 and a reactor outlet at a top portion of slurry reactor 104 as measured along a centerline of the reaction zone is kept essentially constant, e.g., at the same temperature or within the same narrow temperature range where the difference between an upper temperature and a lower temperature is within about 20% of the reactor outlet temperature, or within about 10% of the reactor outlet temperature, or within about 5% of the reactor outlet temperature, or within about 1% of the reactor outlet temperature.

In some embodiments, gas sparger 103 is located in a bottom portion of slurry reactor 104 for flowing gas bubbles to slurry reactor content 106. In some embodiments, the backmixing is provided by flowing a majority of the gas bubbles through at least a center portion of slurry reactor 104 to slurry reactor content 106. In some embodiments, slurry reactor 104 is further configured to generate a slurry stream depleted of gas bubbles, the slurry stream depleted of gas bubbles having a first density and slurry reactor content 106 having a second density less than the first density such that the slurry stream depleted of gas bubbles flows downward in proximity to walls of the slurry reactor based in part on a density difference of the first density and the second density as shown in FIGS. 1A-1D. As one skilled in the art will appreciate, the evaporation of the feedstock occurs while the slurry reactor content flows upward, leading to a higher catalyst content of the slurry reactor content and in turn a higher density of the slurry reactor content. This, in turn, creates a further density difference along the reactor height and promotes backmixing.

The hydrogen stream includes hydrogen, which is contained in a hydrogen "treat gas," for injecting into slurry reactor 104 via line 102. The treat gas can be either pure hydrogen or a hydrogen-containing gas, which is a gas stream containing hydrogen in an amount that is sufficient for the intended reaction(s), optionally including one or more other gases (e.g., nitrogen and light hydrocarbons such as methane). The treat gas stream introduced into a reaction stage can contain at least about 50 vol. % or at least about 75 vol. % hydrogen. Optionally, the hydrogen treat gas can be substantially free (less than about 1 vol. %) of impurities such as $H_2S$ and $NH_3$ and/or such impurities can be substantially removed from a treat gas prior to use. Hydrogen can be supplied co-currently with the input feed to slurry reactor 104 or separately via a separate gas conduit.

In non-limiting illustrative embodiments, in operation, the feedstock and slurry hydroconversion catalyst introduced into slurry reactor 104 via line 101 and the hydrogen stream introduced into slurry reactor 104 via line 102 flow upward as slurry reactor content 106 where the feedstock and slurry hydroconversion catalyst undergo a catalytic reaction with the hydrogen stream to produce a slurry hydroconversion effluent comprising a slurry phase effluent comprising catalyst particles and a liquid product and a vapor phase effluent comprising a hydroconversion product exiting slurry reactor 104 via line 108. In some embodiments, the process involves at least about 60% of the total amount of feedstock in the slurry reactor content being converted into the vapor phase effluent. In some embodiments, the process involves at least about 80% of the total amount of feedstock in the slurry reactor content being converted into the vapor phase effluent. In some embodiments, the process involves at least about 90% of the total amount of feedstock in the slurry reactor content being converted into the vapor phase effluent.

In illustrative embodiments, a hydroconversion product can contain one or more products. For example, in some embodiments, the one or more products can include a hydrocarbon product. A hydrocarbon product as defined herein can include at least about 90% of carbon and hydrogen. In some embodiments, the hydroconversion product can also contain water, $NH_3$, $H_2S$, CO, $CO_2$, etc.

In some embodiments, the slurry phase effluent of the slurry hydroconversion effluent includes catalyst particles as well as a liquid product of, for example, residual unconverted components of the feedstock introduced into slurry reactor 104 via line 101 and hydroconversion products of the slurry hydroconversion process that are not vaporized under the slurry operating conditions. Thus, in some embodiments, the slurry phase effluent includes the catalyst particles and no more than about 40% of the feedstock. In some embodiments, the slurry phase effluent includes the catalyst particles and no more than about 20% of the feedstock. In some embodiments, the slurry phase effluent includes the catalyst particles and no more than about 10% of the feedstock.

FIG. 1A further illustrates the slurry hydroconversion effluent exiting slurry reactor 104 via line 108 to a separation unit 112. The terms "separation unit" and "separator" refer to any separation device(s) that at least partially separates one or more chemical constituents in a mixture from one another. For example, a separation system may selectively separate different chemical constituents from one another, forming one or more chemical fractions. Suitable separation systems include, for example, slurry-vapor two phase separation device. In some embodiments, a separation system that at least partially separates one or more chemical constituents in a mixture from one another can be an internal recirculation pump as discussed below. Thus, the separation processes described in the present disclosure may not completely separate all of one chemical constituent from all of another chemical constituent. Instead, the separation processes described in the present disclosure "at least partially" separate different chemical constituents from one another and, even if not explicitly stated, separation may include only partial separation.

In some embodiments, separation unit 112 separates the vapor phase effluent comprising the hydroconversion product from the slurry hydroconversion effluent. The separation of the vapor phase effluent from the slurry hydroconversion effluent can be based upon, for example, slurry-vapor two phase separation. The vapor phase effluent then exits separation unit 112 via line 116 for further processing. For example, in some embodiments, the vapor phase effluent comprising the hydroconversion product exiting slurry reactor 104 can contain at least a hydrocarbon product that can be condensed into a hydrocarbon of, for example, $C_{11}$ to $C_{18}$ paraffinic distillate. In addition, depending on the type of bio-oil, if used, and the hydroconverting side reactions such as hydrocracking side reactions, various $C_5$ to $C_{10}$ aromatic, naphthenic, and isoparaffinic hydrocarbons may also be present. However, it is to be understood that the above products are merely illustrative and any processing of the hydroconversion product can be carried out using the separated vapor phase effluent.

Separation unit 112 further separates the slurry phase effluent from the slurry hydroconversion effluent. The separated slurry phase effluent exits separation unit 112 via line 114. In some embodiments, separated slurry phase effluent may be withdrawn from separation unit 112 via line 114 continuously or semi-continuously while a fresh/active catalyst can be continuously or semi-continuously added to slurry reactor 104 via line 110.

As shown in FIG. 1B, slurry reactor 104 of slurry reactor system 100 can include a vapor phase zone 107 for containing at least a portion of the vapor phase effluent of slurry hydroconversion effluent following the conversion of the feedstock into a hydroconversion product when it comes into contact with the slurry hydroconversion catalyst and the hydrogen stream. In non-limiting embodiments, in operation, the feedstock and the slurry hydroconversion catalyst introduced into slurry reactor 104 via line 101 and the hydrogen stream introduced into slurry reactor 104 via line 102 flow upward through gas sparger 103 as slurry reactor content 106 where the feedstock and slurry hydroconversion catalyst undergo a catalytic reaction with the hydrogen stream as discussed above to produce a slurry hydroconversion effluent comprising slurry phase effluent comprising catalyst particles and a liquid product and a vapor phase effluent comprising a hydroconversion product.

In some embodiments, slurry reactor 104 is configured to partially separate a major portion of the vapor phase effluent from the slurry hydroconversion effluent. The major portion of the vapor phase effluent flows upwards into vapor phase zone 107, can exit slurry reactor 104 via line 116*a* and can be sent for further processing as discussed above. In some embodiments, at least about 90% of the vapor phase effluent is separated from the slurry hydroconversion effluent. In some embodiments, at least about 95% of the vapor phase effluent is separated from the slurry hydroconversion effluent. In some embodiments, at least about 99% of the vapor phase effluent is separated from the slurry hydroconversion effluent. In some embodiments, at least about 99.5% of the vapor phase effluent is separated from the slurry hydroconversion effluent.

The slurry hydroconversion effluent comprising the slurry phase effluent and a remaining portion of the vapor phase effluent thereafter flows downwards and can continuously exit slurry reactor 104 via line 108. In some embodiments, the slurry hydroconversion effluent comprising the slurry phase effluent and the remaining portion of the vapor phase effluent thereafter flows downward into separation unit 112 where a first portion of the slurry hydroconversion effluent continuously exits slurry reactor 104 via line 108 to separation unit 112 and a second portion of the slurry hydroconversion effluent is combined with the feedstock and slurry hydroconversion catalyst introduced into slurry reactor 104 via line 101 to provide the backmixing.

Separation unit 112 then separates the remining portion of the vapor phase effluent comprising the hydroconversion product from the slurry phase effluent of slurry hydroconversion effluent as discussed above, for example, slurry-vapor two phase separation. The vapor phase effluent then exits separation unit 112 via line 116*b* for further processing as discussed above. The slurry phase effluent thereafter exits separation unit 112 via line 114. In some embodiments, the vapor phase effluent exiting the slurry reactor 104 via line 116*a* and exiting separation unit 112 via line 116*b* will contain, in a total amount, at least about 60% of the feedstock converted into the vapor phase effluent. In some embodiments, the vapor phase effluent exiting the slurry reactor 104 via line 116*a* and exiting separation unit 112 via line 116*b* will contain, in a total amount, at least about 80% of the feedstock converted into the vapor phase effluent. In some embodiments, the vapor phase effluent exiting the slurry reactor 104 via line 116*a* and exiting separation unit 112 via line 116*b* will contain, in a total amount, at least about 90% of the feedstock converted into the vapor phase effluent.

Figure 1C:
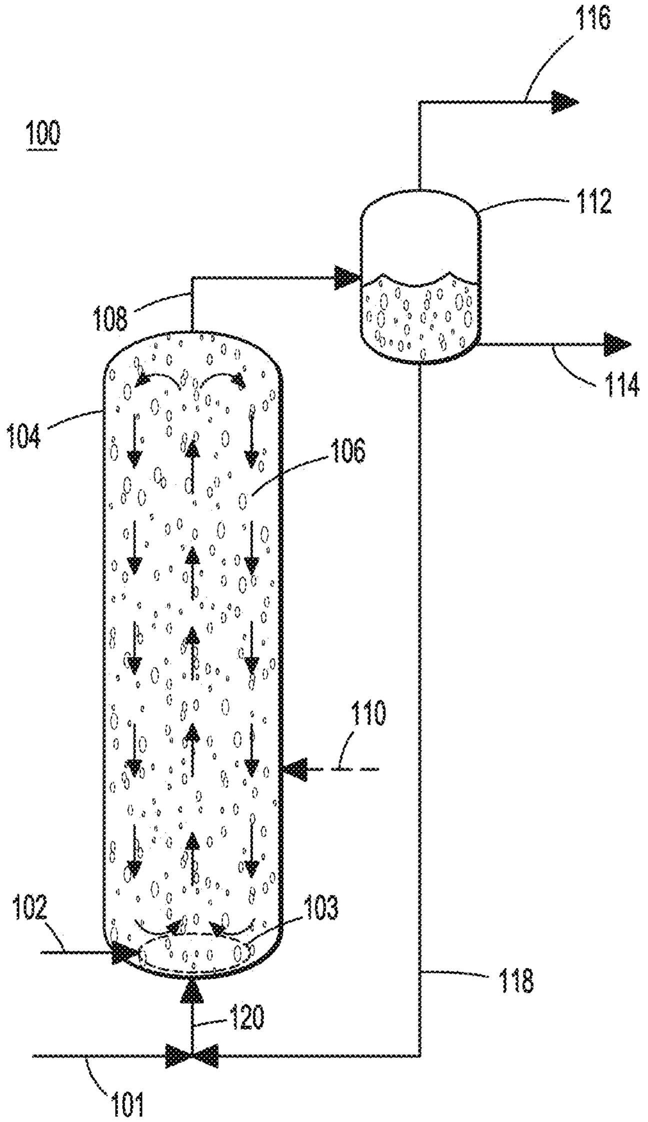
FIG. 1C illustrates a schematic diagram of a slurry reactor system and process with an external separation unit for upgrading a feedstock comprising one or more of fats, oils and greases, according to an illustrative embodiment.
Figure 1D:
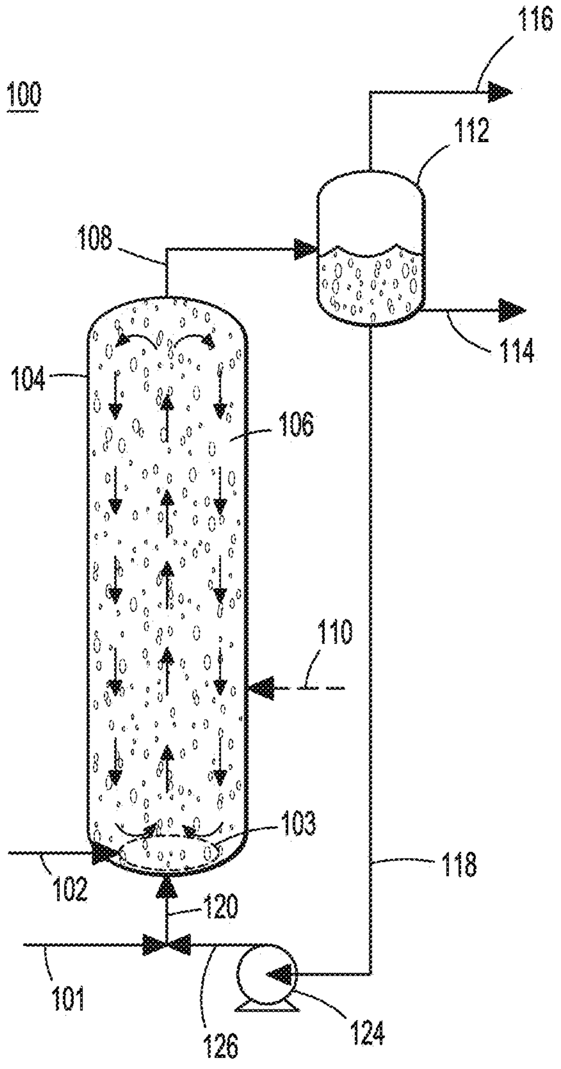
FIG. 1D illustrates a schematic diagram of a slurry reactor system and process with an external separation unit and an external recirculation pump for upgrading a feedstock comprising one or more of fats, oils and greases, according to an illustrative embodiment.

FIGS. 1C and 1D show slurry reactor system 100 according to non-limiting illustrative embodiments for processing the slurry hydroconversion effluent exiting slurry reactor 104 via line 108 to separation unit 112. Separation unit 112 separates the vapor phase effluent comprising the hydroconversion product from the slurry hydroconversion effluent as discussed above. Separation unit 112 also separates the slurry phase effluent comprising catalyst particles and the liquid product from the slurry hydroconversion effluent to produce a slurry recycle stream comprising catalyst particles and the liquid product. A portion of the slurry recycle stream exits separation unit 112 via line 118. Also, as the process is a continuous process, a portion of the slurry recycle stream will continuously exit separation unit 112 via bleed line 114. In some embodiments, a portion of the slurry recycle stream may be withdrawn from separation unit 112 via bleed line 114 continuously or semi-continuously while a fresh/active catalyst can be continuously or semi-continuously added to slurry reactor 104 via line 110.

In accordance with the non-limiting illustrative embodiment of FIG. 1C, the density of the slurry recycle stream exiting separation unit 112 via line 118 is greater than the density of the slurry reactor content 106 in slurry reactor 104. This density gradient thereby promotes a siphon effect as the higher density slurry recycle stream flows downward from separation unit 112 via line 118 where it is combined with the feedstock and slurry hydroconversion catalyst entering slurry reactor 104 via line 101 to form a combined feed stream entering into slurry reactor 104 via line 120 which, in turn, forces slurry reactor content 106 to flow upward in slurry reactor 104 at a flow rate greater than the flow rate of feedstock and slurry hydroconversion catalyst entering via line 101 without the higher density slurry recycle stream. In some embodiments, the flow rate of the combined feed stream entering slurry reactor 104 via line 120 is greater than the flow rate of the incoming feedstock and slurry hydroconversion catalyst entering slurry reactor 104 via line 101. In some embodiments, the siphon effect can provide sufficient backmixing to fluidize the slurry hydroconversion catalyst to maintain a homogeneous or substantially homogeneous slurry reactor content, and an isothermal or substantially isothermal temperature profile in slurry reactor 104 as discussed above.

In accordance with an alternative non-limiting embodiment, FIG. 1D illustrates the slurry recycle stream exiting separation unit 112 via line 118 and sent to an external recirculation pump 124 to recirculate the slurry recycle stream to slurry reactor 104 via line 126 where it is combined with the feedstock and slurry hydroconversion catalyst entering via line 101 to form a combined feed stream entering slurry reactor 104 via line 120. The recirculation rate of the recirculating slurry recycle stream from external recirculation pump 124 into slurry reactor 104 can be at least 1 times the rate of the incoming feedstock and slurry hydroconversion catalyst entering via line 101. In some embodiments, the recirculation rate of the recirculating slurry recycle stream from external recirculation pump 124 into slurry reactor 104 can range from about 3 to about 10 times the rate of the incoming feedstock and slurry hydroconversion catalyst entering slurry reactor 104 via line 101. By employing external recirculation pump 124, the combined feed stream entering slurry reactor 104 via line 120 forces slurry reactor content 106 to flow upward in slurry reactor 104 and into separation unit 112 at a flow rate greater than the flow rate of feedstock and slurry hydroconversion catalyst entering via line 101 without the recirculating slurry recycle stream. In some embodiments, external recirculation pump 124 can provide sufficient backmixing to fluidize the slurry hydroconversion catalyst to maintain a homogeneous or substantially homogeneous slurry reactor content, and an isothermal or substantially isothermal temperature profile in slurry reactor 104 as discussed above.

Figure 2A:
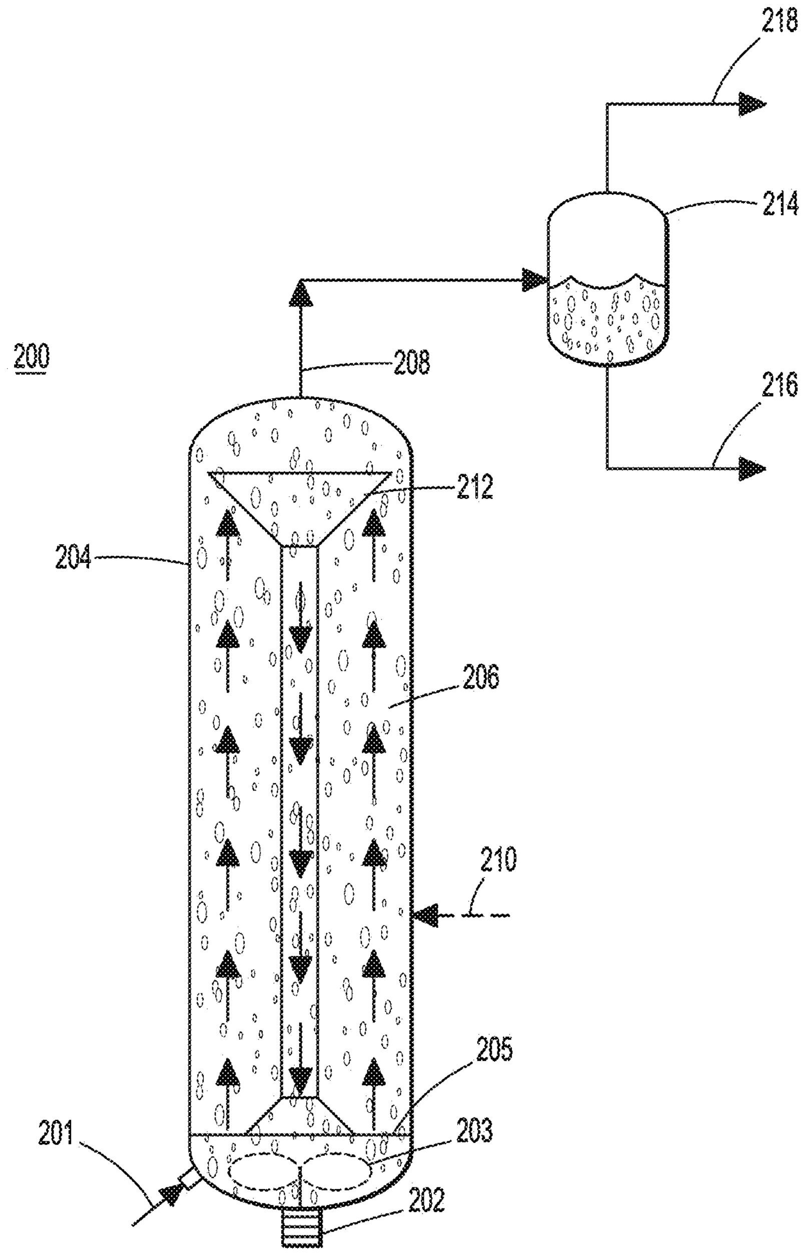
FIG. 2A illustrates a schematic diagram of a slurry reactor system and process with an internal separation unit for upgrading a feedstock comprising one or more of fats, oils and greases, according to an illustrative embodiment.
Figure 2B:
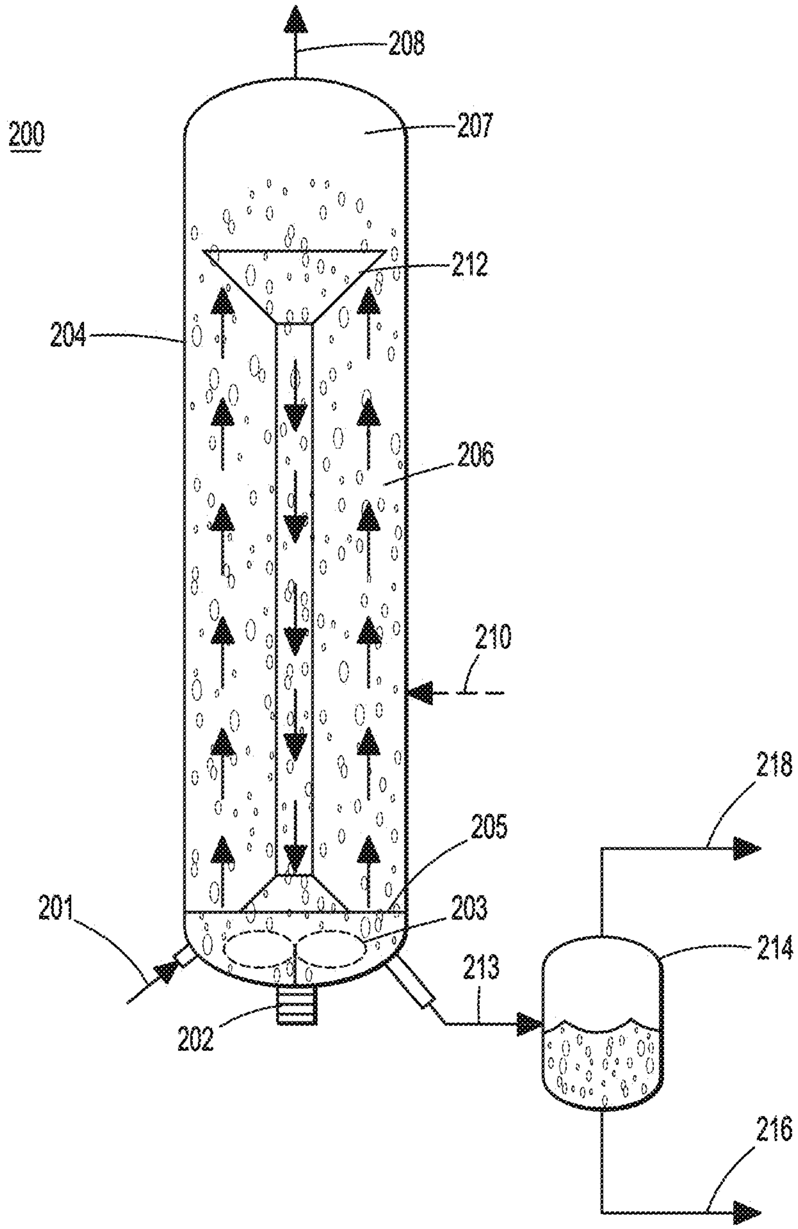
FIG. 2B illustrates a schematic diagram of a slurry reactor system and process with an internal separation unit for upgrading a feedstock comprising one or more of fats, oils and greases, according to an illustrative embodiment.

FIGS. 2A and 2B illustrate non-limiting illustrative alternative embodiments of a slurry reactor system 200. Slurry reactor system 200 includes at least a slurry reactor 204 having a motor 202, a pump 203, a gas sparger 205 (also referred to as a flow distributor) and an internal recirculation pump 212. Slurry reactor 204 can be any of the slurry reactors as discussed above for slurry reactor 104. In some embodiment, slurry reactor 204 is a liquid circulation reactor.

In some embodiments, slurry reactor 204 can be an upflow reactor in which a feedstock and slurry hydroconversion catalyst (also referred to as feed stream) together with the hydrogen stream are introduced into slurry reactor 204 via line 201 at or near the bottom of slurry reactor 204 and below gas sparger 205 and above pump 203. Although it is shown that the feedstock, slurry hydroconversion catalyst and hydrogen stream are co-fed into slurry reactor 204 via line 201, it is contemplated that any arrangement for introducing the feedstock, slurry hydroconversion catalyst and hydrogen stream into slurry reactor 204 can be utilized in the present disclosure as discussed above. In addition, although it is shown that pump 203 is internal to slurry reactor 204, it is contemplated that pump 203 can also be external to slurry reactor 204 and driven by motor 202.

In non-limiting embodiments, in operation, the feedstock, the slurry hydroconversion catalyst and the hydrogen stream introduced into slurry reactor 204 via line 201 flow upward through gas sparger 205 as slurry reactor content 206 where the feedstock and slurry hydroconversion catalyst undergo a catalytic reaction with the hydrogen stream as discussed above to produce a slurry hydroconversion effluent comprising a slurry phase effluent comprising catalyst particles and a liquid product and a vapor phase effluent comprising a hydroconversion product. Slurry reactor content 206 is circulated upwards in slurry reactor 204 utilizing motor 202 and pump 203 together with a partially separated slurry hydroconversion effluent from internal recirculation pump 212. Pump 203 can be any suitable pump for increasing the pressure of the feedstock, the slurry hydroconversion catalyst and the hydrogen stream. For example, pump 203 may be a rotary pump including an impeller, or alternatively may be any other suitable fluid pump. In some embodiments, motor 202 can be inside or external to the slurry reactor 204. In some embodiments, motor 202 and pump 203 may be located external to slurry reactor 204 and connected via piping.

In some embodiments, FIG. 2A illustrates internal recirculation pump 212 separating a portion of the slurry hydroconversion effluent produced from slurry reactor content 206 in slurry reactor 204 and recirculates the separated slurry hydroconversion effluent downward through internal recirculation pump 212 where it is combined with feedstock, slurry hydroconversion catalyst and hydrogen stream co-fed into slurry reactor 204 via line 201 and flowing upwards from gas sparger 205. Thus, as one skilled in the art will appreciate, internal recirculation pump 212 can also be referred to as a partial separation internal recirculation pump 212 according to the illustrative embodiment of FIG. 2A. The recirculation rate of the slurry reactor content 206 can at least 1 times the rate of the incoming feed stream entering slurry reactor 204 via line 201 (e.g., from about 3 to about 10 times the rate of the incoming feed stream entering slurry reactor 204 via line 201). The recirculation of separated slurry hydroconversion effluent in internal recirculation pump 212 forces slurry reactor content 206 to flow upward in slurry reactor 204 and into a separation unit 214. In some embodiments, internal recirculation pump 212 can provide sufficient backmixing to fluidize the slurry hydroconversion catalyst to maintain a homogeneous or substantially homogeneous slurry reactor content, and an isothermal or substantially isothermal temperature profile in slurry reactor 204 as discussed above.

In illustrative embodiments, the remaining portion of the slurry hydroconversion effluent that is not recirculated through internal recirculation pump 212 exits slurry reactor 204 via line 208 and sent to separation unit 214. Separation unit 214 can be any of the separation units discussed above for separation unit 112. Separation unit 214 separates the vapor phase effluent comprising the hydroconversion product from the slurry hydroconversion effluent. The separation of the vapor phase effluent from the slurry hydroconversion effluent can be based upon, for example, slurry-vapor two phase separation. The vapor phase effluent comprising the hydroconversion product then exits separation unit 214 via line 218 for further processing. Separation unit 214 further separates the slurry phase effluent from the slurry hydroconversion effluent. The separated slurry phase effluent exits separation unit 214 via line 216 for further processing.

As shown in FIG. 2B, slurry reactor 204 of slurry reactor system 200 can include a vapor phase zone 207 for containing the vapor phase effluent of slurry hydroconversion effluent following the conversion of the feedstock into a hydroconversion product when it comes into contact with the slurry hydroconversion catalyst and the hydrogen stream. In non-limiting embodiments, in operation, the feedstock, the slurry hydroconversion catalyst and the hydrogen stream introduced into slurry reactor 204 via line 201 flow upward through gas sparger 205 as slurry reactor content 206 where the feedstock and slurry hydroconversion catalyst undergo a catalytic reaction with the hydrogen stream as discussed above to produce a slurry hydroconversion effluent comprising slurry phase effluent comprising catalyst particles and a liquid product and a vapor phase effluent comprising a hydroconversion product.

In some embodiments, slurry reactor 204 is configured to separate a major portion of the vapor phase effluent from the slurry hydroconversion effluent. The major portion of the vapor phase effluent flows upwards into a vapor phase zone 207, can exit slurry reactor 204 via line 208 and can be sent for further processing. In some embodiments, at least about 90% of the vapor phase effluent is separated from the slurry hydroconversion effluent. In some embodiments, at least about 95% of the vapor phase effluent is separated from the slurry hydroconversion effluent. In some embodiments, at least about 99% of the vapor phase effluent is separated from the slurry hydroconversion effluent. In some embodiments, at least about 99.5% of the vapor phase effluent is separated from the slurry hydroconversion effluent.

In some embodiments, internal recirculation pump 212 separates a portion of the vapor phase effluent from the slurry hydroconversion effluent to provide a mixture of vapor and the slurry hydroconversion effluent having a reduced content of the vapor phase effluent. Internal recirculation pump 212 recirculates the mixture of vapor and the slurry hydroconversion effluent having a reduced content of the vapor phase effluent downward through internal recirculation pump 212 where a portion of it is combined with the feedstock, slurry hydroconversion catalyst and hydrogen stream co-fed into slurry reactor 204 via line 201 and flowing upwards from gas sparger 205. Slurry reactor content 206 is circulated upwards in slurry reactor 204 utilizing motor 202 and pump 203 together with the mixture of the vapor phase effluent and the slurry hydroconversion effluent having a reduced content of the vapor phase effluent from internal recirculation pump 212. The recirculation rate of slurry reactor content 206 can be at least 1 times the rate of the incoming feed stream entering slurry reactor 204 via line 201 (e.g., from about 3 to about 10 times the rate of the incoming feed stream entering slurry reactor 204 via line 201). In some embodiments, internal recirculation pump 212 can provide sufficient backmixing to fluidize the slurry hydroconversion catalyst to maintain a homogeneous or substantially homogeneous slurry reactor content, and an isothermal or substantially isothermal temperature profile in slurry reactor 204 as discussed above.

In illustrative embodiments, a portion of the mixture of vapor and the slurry hydroconversion effluent having a reduced content of the vapor phase effluent continuously exits slurry reactor 204 via line 213 and is sent to separation unit 214. Separation unit 214 separates the vapor from the slurry hydroconversion effluent. The separation of vapor from the slurry hydroconversion effluent can be based upon, for example, slurry-vapor two phase separation. The vapor then exits separation unit 214 via line 218 for further processing. The slurry phase effluent exits separation unit 214 via line 216 for further processing. In some embodiments, the slurry phase effluent may be withdrawn from separation unit 214 via line 216 continuously or semi-continuously while a fresh/active catalyst can be continuously or semi-continuously added to slurry reactor 204 via line 210.

According to an aspect of the disclosure, a slurry reactor system comprises:

a slurry reactor configured to convert, under slurry hydroconversion conditions, a slurry reactor content flowing upwards and comprising a feedstock comprising one or more of fats, oils and greases, a slurry hydroconversion catalyst and a hydrogen stream to a slurry hydroconversion effluent comprising a slurry phase effluent comprising catalyst particles and liquid product and a vapor phase effluent comprising a hydroconversion product, and a separation unit external to the slurry reactor, the separation unit being configured to separate the slurry phase effluent from the vapor phase effluent to produce a slurry recycle stream, wherein an inlet of the separation unit is in fluid communication with an outlet of the slurry reactor to receive the slurry hydroconversion effluent from the slurry reactor and an outlet of the separation unit is in fluid communication with an inlet of the slurry reactor to receive the slurry recycle stream from the separation unit, wherein the slurry reactor is further configured to provide backmixing to fluidize the slurry hydroconversion catalyst to maintain a substantially homogeneous slurry reactor content, and a substantially isothermal temperature profile in the slurry reactor, and wherein at least about 60% of the feedstock is converted into the vapor phase effluent.

In one or more additional illustrative embodiments, as may be combined with the preceding paragraphs, at least about 80% of the feedstock is converted into the vapor phase effluent.

In one or more additional illustrative embodiments, as may be combined with the preceding paragraphs, at least about 90% of the feedstock is converted into the vapor phase effluent.

In one or more additional illustrative embodiments, as may be combined with the preceding paragraphs, the slurry reactor system further comprises a gas sparger located in a bottom portion of the slurry reactor.

In one or more additional illustrative embodiments, as may be combined with the preceding paragraphs, the backmixing is provided by flowing a majority of gas bubbles from the gas sparger through a center portion of the slurry reactor to the slurry reactor content.

In one or more additional illustrative embodiments, as may be combined with the preceding paragraphs, the slurry reactor is further configured to generate a slurry stream depleted of gas bubbles, the slurry stream depleted of gas bubbles having a first density and the slurry reactor content having a second density less than the first density such that the slurry stream depleted of gas bubbles flows downward in proximity to walls of the slurry reactor based in part on a density difference of the first density and the second density.

In one or more additional illustrative embodiments, as may be combined with the preceding paragraphs, the slurry recycle stream has a first density and the slurry reactor content has a second density lower than the first density, and wherein the backmixing is provided by flowing the slurry recycle stream from a bottom portion of the separation unit to the bottom portion of the slurry reactor based in part on a density difference between the first density and the second density.

In one or more additional illustrative embodiments, as may be combined with the preceding paragraphs, the slurry reactor system further comprises a recirculation pump in fluid communication with the inlet of the slurry reactor and the outlet of the separation unit, wherein the recirculation pump is configured to recirculate the slurry recycle stream from the separation unit to the slurry reactor.

In one or more additional illustrative embodiments, as may be combined with the preceding paragraphs, the feedstock comprises one or more of animal fats, animal oils, plant fats, plant oils, vegetable fats, vegetable oils, greases, and used cooking oil.

In one or more additional illustrative embodiments, as may be combined with the preceding paragraphs, the slurry hydroconversion catalyst comprises a metal sulfide comprising one or more metals selected from the group consisting of molybdenum, nickel, cobalt and tungsten, and the slurry hydroconversion catalyst further comprises particles having an average particle size of about 0.1 micron to about 200 microns.

According to another aspect of the disclosure, a continuous process comprises:

converting, under slurry hydroconversion conditions, a slurry reactor content flowing upwards in a slurry reactor and comprising a feedstock comprising one or more of fats, oils and greases, a slurry hydroconversion catalyst and a hydrogen stream to a slurry hydroconversion effluent comprising a slurry phase effluent comprising catalyst particles and liquid product and a vapor phase effluent comprising a hydroconversion product, separating, in a separation unit external to the slurry reactor, the slurry phase effluent comprising catalyst particles and liquid product from the vapor phase effluent comprising a hydroconversion product to produce a slurry recycle stream, and flowing the slurry recycle stream to the slurry reactor, wherein the slurry reactor is configured to provide backmixing to fluidize the slurry hydroconversion catalyst to maintain a substantially homogeneous slurry reactor content, and a substantially isothermal temperature profile in the slurry reactor, and wherein at least about 60% of the feedstock is converted into the vapor phase effluent.

In one or more additional illustrative embodiments, as may be combined with the preceding paragraphs, at least about 80% of the feedstock is converted into the vapor phase effluent.

In one or more additional illustrative embodiments, as may be combined with the preceding paragraphs, at least about 90% of the feedstock is converted into the vapor phase effluent.

In one or more additional illustrative embodiments, as may be combined with the preceding paragraphs, the slurry recycle stream has a first density and the slurry reactor content has a second density lower than the first density, and wherein the backmixing is provided by flowing the slurry recycle stream from a bottom portion of the separation unit to a bottom portion of the slurry reactor based in part on a density difference between the first density and the second density.

In one or more additional illustrative embodiments, as may be combined with the preceding paragraphs, the slurry reactor is a bubble column slurry reactor system and the process further comprises flowing gas bubbles through the slurry reactor content in the slurry reactor to provide the backmixing to fluidize the slurry hydroconversion catalyst to maintain a substantially homogeneous slurry reactor content, and a substantially isothermal temperature profile in the bubble column slurry reactor system.

In one or more additional illustrative embodiments, as may be combined with the preceding paragraphs, the continuous process further comprises generating a slurry stream depleted of gas bubbles, the slurry stream depleted of gas bubbles having a first density and the slurry reactor content having a second density less than the first density such that the slurry stream depleted of gas bubbles flows downward in proximity to walls of the slurry reactor based in part on a density difference of the first density and the second density.

In one or more additional illustrative embodiments, as may be combined with the preceding paragraphs, where flowing the slurry recycle stream from the separation unit to the slurry reactor is driven by a recirculation pump.

In one or more additional illustrative embodiments, as may be combined with the preceding paragraphs, a portion of the slurry recycle stream is continuously removed from the separation unit and another portion of the slurry recycle stream flows to the slurry reactor.

In one or more additional illustrative embodiments, as may be combined with the preceding paragraphs, the feedstock comprises one or more of animal fats, animal oils, plant fats, plant oils, vegetable fats, vegetable oils, greases, and used cooking oil.

In one or more additional illustrative embodiments, as may be combined with the preceding paragraphs, the slurry hydroconversion catalyst comprises a metal sulfide comprising one or more metals selected from the group consisting of molybdenum, nickel, cobalt and tungsten, and the slurry hydroconversion catalyst further comprises particles having an average particle size of about 0.1 micron to about 200 microns.

Various features disclosed herein are, for brevity, described in the context of a single embodiment, but may also be provided separately or in any suitable sub-combination. All combinations of the embodiments are specifically embraced by the illustrative embodiments disclosed herein just as if each and every combination was individually and explicitly disclosed. In addition, all sub-combinations listed in the embodiments describing such variables are also specifically embraced by the present disclosure and are disclosed herein just as if each and every such sub-combination was individually and explicitly disclosed herein.

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A slurry reactor system, comprising:

a slurry reactor configured to convert, under slurry hydroconversion conditions, a slurry reactor content flowing upwards and comprising a feedstock comprising one or more of fats, oils and greases, a slurry hydroconversion catalyst and a hydrogen stream to a slurry hydroconversion effluent comprising a slurry phase effluent comprising catalyst particles and liquid product and a vapor phase effluent comprising a hydroconversion product;

a separation unit external to the slurry reactor, the separation unit being configured to separate the slurry phase effluent from the vapor phase effluent to produce a slurry recycle stream; and a recycle line configured to recycle the slurry phase stream from the separation unit to the slurry reactor;

wherein the slurry reactor is a bubble column reactor;

wherein an inlet of the separation unit is in fluid communication with an outlet of the bubble column reactor to receive the slurry hydroconversion effluent from the bubble column reactor and an outlet of the separation unit is in fluid communication with an inlet of the bubble column reactor to receive the slurry recycle stream from the separation unit;

wherein the bubble column reactor is further configured to provide backmixing to fluidize the slurry hydroconversion catalyst;

wherein the backmixing maintains a substantially homogeneous slurry reactor content, and a substantially isothermal temperature profile in the bubble column reactor; and wherein at least about 60% of the feedstock is converted into the vapor phase effluent in the bubble column reactor.

2. The slurry reactor system according to claim 1, wherein at least about 80% of the feedstock is converted into the vapor phase effluent.

3. The slurry reactor system according to claim 1, wherein at least about 90% of the feedstock is converted into the vapor phase effluent.

4. The slurry reactor system according to claim 1, further comprising a gas sparger located in a bottom portion of the bubble column reactor.

5. The slurry reactor system according to claim 4, wherein the backmixing is provided by flowing a majority of gas bubbles from the gas sparger through a center portion of the bubble column reactor to the slurry reactor content.

6. The slurry reactor system according to claim 5, wherein the bubble column reactor is further configured to generate a slurry stream depleted of gas bubbles, the slurry stream depleted of gas bubbles having a first density and the slurry reactor content having a second density less than the first density such that the slurry stream depleted of gas bubbles flows downward in proximity to walls of the bubble column reactor based in part on a density difference of the first density and the second density.

7. The slurry reactor system according to claim 1, wherein the slurry recycle stream has a first density and the slurry reactor content has a second density lower than the first density, and wherein the backmixing is provided by flowing the slurry recycle stream from a bottom portion of the separation unit to the bottom portion of the bubble column reactor based in part on a density difference between the first density and the second density.

8. The slurry reactor system according to claim 1, further comprising a recirculation pump in fluid communication with the inlet of the bubble column reactor and the outlet of the separation unit, wherein the recirculation pump is configured to recirculate the slurry recycle stream from the separation unit to the bubble column reactor.

9. The slurry reactor system according to claim 1, wherein the feedstock comprises one or more of animal fats, animal oils, plant fats, plant oils, vegetable fats, vegetable oils, greases, and used cooking oil.

10. The slurry reactor system according to claim 1, wherein the slurry hydroconversion catalyst comprises a metal sulfide comprising one or more metals selected from the group consisting of molybdenum, nickel, cobalt and tungsten, and the slurry hydroconversion catalyst further comprises particles having an average particle size of about 0.1 micron to about 200 microns.

11. A continuous process, comprising:

converting, under slurry hydroconversion conditions, a slurry reactor content flowing upwards in a slurry reactor and comprising a feedstock comprising one or more of fats, oils and greases, a slurry hydroconversion catalyst and a hydrogen stream to a slurry hydroconversion effluent comprising a slurry phase effluent comprising catalyst particles and liquid product and a vapor phase effluent comprising a hydroconversion product;

separating, in a separation unit external to the slurry reactor, the slurry phase effluent comprising catalyst particles and liquid product from the vapor phase effluent comprising a hydroconversion product to produce a slurry recycle stream; and recycling the slurry recycle stream from the separation unit to the slurry reactor;

wherein the slurry reactor is a bubble column reactor;

wherein the bubble column reactor is further configured to provide backmixing to fluidize the slurry hydroconversion catalyst;

wherein the backmixing maintains a substantially homogeneous slurry reactor content, and a substantially isothermal temperature profile in the bubble column reactor; and wherein at least about 60% of the feedstock is converted into the vapor phase effluent in the bubble column reactor.

12. The continuous process according to claim 11, wherein at least about 80% of the feedstock is converted into the vapor phase effluent.

13. The continuous process according to claim 11, wherein at least about 90% of the feedstock is converted into the vapor phase effluent.

14. The continuous process according to claim 11, wherein the slurry recycle stream has a first density and the slurry reactor content has a second density lower than the first density, and wherein the backmixing is provided by flowing the slurry recycle stream from a bottom portion of the separation unit to a bottom portion of the bubble column reactor based in part on a density difference between the first density and the second density.

15. The continuous process according to claim 11, further comprising flowing gas bubbles through the slurry reactor content in the bubble column reactor to provide the backmixing to fluidize the slurry hydroconversion catalyst to maintain a substantially homogeneous slurry reactor content, and a substantially isothermal temperature profile in the bubble column reactor.

16. The continuous process according to claim 15, further comprising generating a slurry stream depleted of gas bubbles, the slurry stream depleted of gas bubbles having a first density and the slurry reactor content having a second density less than the first density such that the slurry stream depleted of gas bubbles flows downward in proximity to walls of the bubble column reactor based in part on a density difference of the first density and the second density.

17. The continuous process according to claim 11, wherein flowing the slurry recycle stream from the separation unit to the bubble column reactor is driven by a recirculation pump.

18. The continuous process according to claim 11, wherein a portion of the slurry recycle stream is continuously removed from the separation unit and another portion of the slurry recycle stream flows to the bubble column reactor.

19. The continuous process according to claim 11, wherein the feedstock comprises one or more of animal fats, animal oils, plant fats, plant oils, vegetable fats, vegetable oils, greases, and used cooking oil.

20. The continuous process according to claim 11, wherein the slurry hydroconversion catalyst comprises a metal sulfide comprising one or more metals selected from the group consisting of molybdenum, nickel, cobalt and tungsten, and the slurry hydroconversion catalyst further comprises particles having an average particle size of about 0.1 micron to about 200 microns.

* * * * *